US008865945B2

(12) United States Patent
Lorenz et al.

(10) Patent No.: US 8,865,945 B2
(45) Date of Patent: *Oct. 21, 2014

(54) PROCESS FOR THE PREPARATION OF POLYOLS

(75) Inventors: Klaus Lorenz, Dormagen (DE); Arnulf Werner, Dormagen (DE); Marcus Eichmann, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/228,690

(22) Filed: Aug. 15, 2008

(65) Prior Publication Data

US 2009/0048420 A1 Feb. 19, 2009

(30) Foreign Application Priority Data

Aug. 16, 2007 (DE) .......................... 10 2007 038 436

(51) Int. Cl.
| | | |
|---|---|---|
| C07C 41/44 | (2006.01) | |
| C07C 41/03 | (2006.01) | |
| C07C 41/34 | (2006.01) | |
| C07C 41/46 | (2006.01) | |

(52) U.S. Cl.
USPC ........................... 568/621; 568/623; 568/624

(58) Field of Classification Search
USPC ............................ 528/76; 568/621, 623, 624
See application file for complete search history.

(56) References Cited

U.S. PATENT DOCUMENTS

| | | | |
|---|---|---|---|
| 2,425,845 A | | 8/1947 | Toussaint et al. |
| 2,983,763 A | * | 5/1961 | Krause .......................... 568/608 |
| 3,823,145 A | | 7/1974 | Louvar et al. |
| 4,110,268 A | | 8/1978 | Longley et al. |
| 4,521,548 A | | 6/1985 | Christen et al. |
| 5,030,758 A | | 7/1991 | Dietrich et al. |
| 5,304,665 A | * | 4/1994 | Cooper et al. ................. 554/149 |
| 5,399,728 A | * | 3/1995 | Cooper .......................... 554/149 |
| 5,470,813 A | | 11/1995 | Le-Khac |
| 5,482,908 A | | 1/1996 | Le-Khac |
| 5,536,883 A | | 7/1996 | Le-Khac |
| 5,545,601 A | | 8/1996 | Le-Khac |
| 5,627,120 A | | 5/1997 | Le-Khac |
| 5,637,673 A | | 6/1997 | Le-Khac |
| 5,712,216 A | | 1/1998 | Le-Khac et al. |
| 5,714,428 A | | 2/1998 | Le-Khac |
| 5,786,405 A | | 7/1998 | Schilling et al. |
| 5,789,626 A | | 8/1998 | Le-Khac |
| 6,018,017 A | | 1/2000 | Le-Khac |
| 6,376,625 B1 | | 4/2002 | Cosman et al. |
| 6,586,566 B1 | | 7/2003 | Hofmann et al. |
| 6,762,214 B1 | | 7/2004 | Tracy et al. |
| 6,827,858 B2 | | 12/2004 | Bader et al. |
| 7,008,900 B1 | | 3/2006 | Hofmann et al. |
| 8,501,904 B2 | * | 8/2013 | Lorenz et al. .................. 528/405 |
| 2003/0150814 A1 | | 8/2003 | Bader et al. |
| 2004/0167316 A1 | | 8/2004 | Anderson et al. |
| 2008/0114086 A1 | * | 5/2008 | Lorenz et al. .................... 521/88 |

FOREIGN PATENT DOCUMENTS

| | | |
|---|---|---|
| CN | 1696174 A | 11/2005 |
| EP | 0047371 A1 | 3/1982 |
| EP | 0671361 A1 | 9/1995 |
| JP | 6157743 A | 6/1994 |
| JP | 1030023 A | 2/1998 |
| WO | 9620972 A2 | 7/1996 |

OTHER PUBLICATIONS

Mihail Ionescu et al, "New Synthetic Pathways to Polyether Polyols for Rigid Polyurethane Foams", (month unavailable) 1998, 14, p. 151-218.

* cited by examiner

*Primary Examiner* — Rabon Sergent
(74) *Attorney, Agent, or Firm* — N. Denise Brown

(57) ABSTRACT

The present invention provides polyols which can be obtained by a simple process. These polyols, unless explicitly specified, are to be understood to encompass both polyether polyols and polyether ester polyols. The invention further provides the simple process for the production of the polyols, and also, the production of polyurethanes comprising reacting a polyol according to the invention with a polyisocyanate.

6 Claims, No Drawings

PROCESS FOR THE PREPARATION OF POLYOLS

CROSS REFERENCE TO RELATED APPLICATIONS

The present patent application claims the right of priority under 35 U.S.C. §119 (a)-(d) of German Patent Application No. 10 2007 038 436.1, filed on Aug. 16, 2008.

BACKGROUND OF THE INVENTION

The present invention relates to polyols which can be obtained by a simple process. As used herein, unless explicitly specified, the term polyols is to be understood as meaning both polyether polyols and polyether ester polyols. The present invention also provides a simple process for the production of these polyols, and also the production of polyurethane materials from the reaction of these polyols with a polyisocyanate component.

Polyols that are suitable for the production of polyurethane materials such as flexible or rigid foams and compact materials such as elastomers, are generally obtained by polymerisation of suitable alkylene oxides onto polyfunctional starter compounds, i.e. starter compounds containing a plurality of Zerewitinoff-active hydrogen atoms. A very wide variety of processes, some of which complement each other, have for a long time been known for carrying out these polymerisation reactions.

On the one hand, the base-catalysed addition of alkylene oxides to starter compounds having Zerewitinoff-active hydrogen atoms is of importance on a commercial scale. on the other hand, the use of double metal cyanide compounds ("DMC catalysts") for carrying out this reaction is becoming increasingly important. The use of highly active DMC catalysts, which are described, for example, in U.S. Pat. No. 5,470,813, EP-A 700 949, EP-A 743 093, EP-A 761 708, WO 97/40086, WO 98/16310 and WO 00/47649, allows polyether polyols to be prepared with very low catalyst concentrations (25 ppm or less), so that it is no longer necessary to separate the catalyst from the finished product. However, these catalysts are not suitable for the preparation of short-chained polyols or of polyols having high ethylene oxide contents. The basic catalysts which have been known for a long time, for example those catalysts based on alkali metal hydroxides, allow short-chained polyols and/or polyols having a high ethylene oxide content to be prepared without problems, but the catalyst generally has to be removed from the crude alkaline polymer by means of a separate working-up step. The (Lewis) acid-catalysed addition of alkylene oxides to suitable starter compounds is of lesser importance.

The base-catalysed addition of alkylene oxides such as, for example, ethylene oxide or propylene oxide, to starter compounds having Zerewitinoff-active hydrogen atoms is typically carried out, as already mentioned, in the presence of alkali metal hydroxides. It is also possible, however, to use alkali metal hydrides, alkali metal carboxylates, alkaline earth hydroxides or amines such as, for example, N,N-dimethylbenzylamine or imidazole or imidazole derivatives as catalysts in this process.

After the addition of the alkylene oxides, the polymerisation-active centers on the polyether chains must be deactivated. Various procedures are possible for achieving this. For example, neutralization can be carried out with dilute mineral acids such as sulfuric acid or phosphoric acid. The strength of the second dissociation stage of sulfuric acid is sufficient for the protonation of the alkali metal hydroxides formed by hydrolysis of the active alcoholate groups, so that 2 mol of alcoholate groups can be neutralized per mol of sulfuric acid used. Phosphoric acid, on the other hand, must be used in an equimolar amount relative to the amount of alcoholate groups to be neutralized. In both cases, the salts formed in the neutralization and/or during the removal of the water by distillation must be separated off by means of filtration processes. Distillation and filtration processes are time- and energy-intensive and, in addition, are not readily reproducible in some cases. Many processes have therefore been developed which can be carried out without a filtration step and, in many cases, also without a distillation step: Neutralization with hydroxycarboxylic acids such as, for example, lactic acid is described in WO 9820061 and U.S. Published Patent Application 2004167316 for the working-up of short-chained polyols for rigid foam applications; such processes are widespread and well established. U.S. Pat. No. 4,521,548 describes how the polymerisation-active centers can be deactivated in a similar manner by reaction with formic acid. The metal carboxylates formed after neutralization with hydroxycarboxylic acids or formic acid dissolve in the polyether polyols to give a clear solution. However, a disadvantage of these processes is the catalytic activity of the salts that remain in the products, which is undesirable for many polyurethane applications. Therefore, in JP-A 10-30023 and U.S. Pat. No. 4,110,268, aromatic sulfonic acids or organic sulfonic acids are used for the neutralization; these likewise form salts which are soluble in the polyether polyols but are less basic and are distinguished by lower catalytic activity. A crucial disadvantage here is the high cost of the sulfonic acids. Working up by means of acidic cation exchangers, as is described in DE-A 100 24 313, requires the use of solvents and the removal thereof by distillation, and is accordingly likewise associated with high costs. Phase separation processes require only a hydrolysis step and not a neutralization step and are described, for example, in WO 0114456, JP-A 6-157743, WO 9620972 and U.S. Pat. No. 3,823,145. The phase separation of the polyether polyols from the alkaline aqueous phase is assisted by the use of coalescers or centrifuges; here too, solvents must often be added in order to increase the difference in density between the polyether phase and the water phase. Such processes are not suitable for all polyether polyols; they are unsuccessful in particular in the case of short-chained polyether polyols or polyether polyols having high ethylene oxide contents. The working up of polyether ester polyols cannot be carried out by such phase separation processes because the long period of contact of the polyether ester chains with the alkaline aqueous phase would doubtless lead to irreversible hydrolysis of the ester bonds. The use of solvents is cost-intensive, and centrifuges require a high outlay in terms of maintenance.

In the case of amine-catalysed alkylene oxide addition reactions, further working up can be dispensed with provided that the presence of the amines in the polyols does not impair the production of polyurethane materials. Only polyols having comparatively low equivalent weights can be obtained by amine catalysis, see in this connection, for example, Ionescu et al. in "Advances in Urethane Science & Technology", 1998, 14, p. 151-218.

Therefore, the object of the present invention was to find an inexpensive working-up process for ethylene-oxide-containing polyols prepared with alkali or alkaline earth hydroxide, carboxylate or hydride catalysis, in which the process does not exhibit the disadvantages of the processes of the prior art. In particular, the polyols are to have low base contents, which ensures that they are widely usable in both "one shot" and prepolymer applications.

SUMMARY OF THE INVENTION

The present invention provides a process for the preparing of polyols. This process comprises
(1) base-catalyzed addition of
   (a) one or more alkylene oxides in which the proportion of ethylene oxide present in the alkylene oxides is at least 10 weight %, based on 100 weight % of the alkylene oxides present;
   to
   (b) one or more polyfunctional starter compounds having Zerewitinoff-active hydrogen atoms;
   in the presence of
   (c) one or more suitable base catalysts;
and
(2) neutralizing the alkaline polymerisaton-active centers of the crude alkylene oxide addition product by adding sulfuric acid in such a manner that, of from 66 mol % to 100 mol % of the acid used, only the first dissociation stage is effective for neutralization of the amount of catalyst contained in the crude polymer.

This can be achieved by, for example, adding at least 50% more acid than the amount which is necessary to neutralize the basic catalyst. Surprisingly, completely clear products having a low base content are obtained by this procedure. It is not important here whether or not the actual neutralization is preceded by a hydrolysis step. The improvement in product quality achieved by the process according to the invention is particularly effective, however, when the actual neutralization is preceded by a hydrolysis step. In the absence of a hydrolysis step, the resultant products otherwise have a stronger tendency to cloudiness. The method is applicable for the preparation of both long- and short-chained polyether polyols, and includes those polyols which are characterized by an OH number range which extends from approximately 20 mg KOH/g to approximately 1000 mg KOH/g. The structure of the polyether chains, that is to say the composition of the alkylene oxide mixture used in the preparation of the polyols, can likewise be varied. The amount of ethylene oxide in the alkylene oxide metered in is at least 10 weight %, preferably at least 20 weight %, more preferably at least 30 weight % and most preferably more than 50 weight %. Obviously, the weight of the ethylene oxide is based on 100% by weight of all alkylene oxides.

DETAILED DESCRIPTION OF THE INVENTION

In detail, the process according to the invention is carried out as described herein.

The starter compounds having Zerewitinoff-active hydrogen atoms are conventionally placed in the reactor first, and the catalyst, i.e. the alkali metal hydroxide, alkali, alkaline earth metal hydride, alkali, alkaline earth metal carboxylate or alkaline earth hydroxide, is added thereto. Alkali metal hydroxides are preferably used; and potassium hydroxide is particularly preferred. The catalyst can be fed to the starter compound in the form of an aqueous solution or in solid form. The catalyst concentration, based on the amount of end product, is from 0.004 to 0.5 weight %, preferably from 0.01 to 0.1 weight %, and more preferably from 0.025 to 0.07 weight %. The solvent water and/or the water liberated in the reaction of the Zerewitinoff-active hydrogen atoms with the catalyst can be removed in vacuo at elevated temperature, preferably at the reaction temperature, before the start of the metered addition of the alkylene oxide(s).

Suitable basic catalysts for the process herein include, for example, the alkali metal hydroxides, alkali metal hydrides, alkaline earth metal hydrides, alkali metal carboxylates, alkaline earth metal carboxylates and/or alkaline earth hydroxides. Alkali metal hydroxides are preferably used as the basic catalysts. Potassium hydroxide is a particularly preferred catalyst.

In accordance with the present invention, it is also possible that the basic catalysts for this process are pre-prepared alkylene oxide addition products of starter compounds containing Zerewitinoff-active hydrogen atoms having alkoxylate contents of from 0.05 to 50 equivalence % ("polymeric alkoxylates"). The alkoxylate content of the catalyst is to be understood as meaning the proportion of Zerewitinoff-active hydrogen atoms in all the Zerewitinoff-active hydrogen atoms originally present in the alkylene oxide addition product of the catalyst that has been removed by a base by deprotonation. The amount of polymeric alkoxylate used is, of course, governed by the desired catalyst concentration for the amount of end product, as described previously.

The starter compounds placed in the reactor first are then reacted with alkylene oxides under an inert gas atmosphere at temperatures of from 80 to 180° C., preferably from 100 to 170° C., with the alkylene oxides being fed continuously to the reactor in the conventional manner so that the safety-related pressure limits of the reactor system used are not exceeded. Such reactions are conventionally carried out in the pressure range from 10 mbar to 10 bar. The alkylene oxide addition phase is normally followed by a post-reaction phase in which residual alkylene oxide reacts to completion. The end of this post-reaction phase is reached when no further pressure drop can be detected in the reaction vessel. The alkaline alkylene oxide addition product can then first be hydrolysed by means of water. As previously mentioned, however, this hydrolysis step is not essential for the implementation of the process according to the invention. The amount of water for the hydrolysis can be up to 15 weight %, based on the amount of alkaline alkylene oxide addition product. Neutralization of the alkaline, polymerisation-active centers of the crude, optionally hydrolyzed alkylene oxide addition product is then carried out by addition of sulfuric acid in such a manner that, of from 66 mol % to 100 mol %, preferably from 75 mol % to 90 mol %, of the acid used, only the first dissociation stage is effective for neutralization of the amount of catalyst contained in the crude polymer. This can be achieved, for example, by using at least 50% more acid than would be necessary for neutralizing the basic catalyst. The temperature in the hydrolysis and neutralization can be varied within wide ranges. Typically, these limits are set by the corrosion resistance of the materials of the neutralization vessel or by the polyol structure. If hydrolysis-sensitive groups, such as, for example, ester groups, are present in the products, the neutralization can be carried out, for example, at room temperature. In such cases it is also recommended to dispense with a prior, separate hydrolysis step. When the neutralization has been carried out, traces of water which have been introduced by the addition of dilute acids, or excess hydrolysis water can be removed in vacuo. Anti-ageing agents or antioxidants can be added to the products during or after the neutralization. Further working-up steps, such as, for example, filtration of the product, are not necessary. The clear end products preferably have base contents of less than 100 ppm, particularly preferably of less than 50 ppm.

Suitable starter compounds having Zerewitinoff-active hydrogen atoms mostly have functionalities of from 1 to 8, but in particular cases they may also have functionalities up to 35. Their molar masses of these starter compounds may range from 60 g/mol to 1200 g/mol. In addition to hydroxy-functional starters, amino-functional starters can also be used.

Examples of hydroxy-functional starter compounds include methanol, ethanol, 1-propanol, 2-propanol and higher aliphatic monols, in particular fatty alcohols, phenol, alkyl-substituted phenols, propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, saccharose, hydroquinone, pyrocatechol, resorcinol, bisphenol F, bisphenol A, 1,3,5-trihydroxybenzene, methylol-group-containing condensation products of formaldehyde and phenol or melamine or urea, as well as Mannich bases. It is also possible to use highly functional starter compounds based on hydrogenated starch hydrolysis products. Such products are described, for example, in EP-A 1 525 244, which is believed to correspond to U.S. Pat. No. 6,710,096, the disclosure of which is hereby incorporated by reference. Examples of amino-group-containing starter compounds are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and also higher-nuclear products obtained in the condensation of aniline with formaldehyde to yield diaminodiphenylmethane. In addition, ring-opening products of cyclic carboxylic acid anhydrides and polyols can be used as starter compounds. Examples are ring-opening products of phthalic anhydride, succinic anhydride, maleic anhydride on the one hand and ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol or sorbitol on the other hand. In addition, it is also possible to use mono- or poly-functional carboxylic acids directly as starter compounds. Of course, mixtures of various starter compounds can also be used.

It is also possible to add to the process pre-prepared alkylene oxide addition products of the mentioned starter compounds, that is to say polyether polyols having OH numbers of from 20 to 1000 mg KOH/g, preferably from 250 to 1000 mg KOH/g. Such pre-prepared alkylene oxide addition products can be used instead or in addition to the starter compounds described in the preceding paragraph. Of the alkylene oxides used in the preparation of the pre-prepared alkylene oxide addition products, at least 10 weight %, preferably at least 20 weight %, more preferably at least 30 weight % and most preferably more than 50 weight %, based on 100% by weight of the alkylene oxides, should be ethylene oxide. It is also possible to use in the process according to the invention, in addition to the starter compounds, one or more polyester polyols having OH numbers in the range from 6 to 800 mg KOH/g, with the aim of preparing polyether ester polyols. Polyester polyols which are suitable for this purpose can be prepared, for example, from organic dicarboxylic acids having from 2 to 12 carbon atoms and polyhydric alcohols, preferably diols, having from 2 to 12 carbon atoms, preferably from 2 to 6 carbon atoms, according to known processes.

Against the background of scarce petrochemical resources and the unfavorable rating of fossil raw materials in ecobalances, the use of raw materials from renewable sources is increasingly gaining importance, even in the preparation of polyols suitable for the polyurethane industry. The process according to the invention opens up a highly economical possibility of preparing such polyols by adding to the process, before or during the addition of the alkylene oxides, one or more triglycerides such as, for example, soybean oil, rape oil, palm kernel oil, palm oil, linseed oil, sunflower oil, herring oil, sardine oil, lesquerella oil and/or castor oil, in amounts of from 10 to 80 weight %, based on the amount of end product. In the resulting polyether ester polyols, the oils have been incorporated completely into the structure so that they can no longer be detected in the end product, or can be detected in only very small amounts.

The mentioned polymeric alkoxylates, which can be used as catalysts, are typically prepared in a separate reaction step by alkylene oxide addition to starter compounds containing Zerewitinoff-active hydrogen atoms. Conventionally, in the preparation of the polymeric alkoxylate, there is used an alkali or alkaline earth metal hydroxide, for example KOH, in amounts of from 0.1 to 1 weight %, based on the amount to be prepared as catalyst, the reaction mixture is, if necessary, dewatered in vacuo, the alkylene oxide addition reaction is carried out under an inert gas atmosphere at from 100 to 170° C. until an OH number of from 150 to 1200 mg KOH/g is reached, and then the above-mentioned alkoxylate contents of from 0.05 to 50 equivalence % are established, if necessary, by the addition of further alkali or alkaline earth metal hydroxide, and subsequent dewatering. Polymeric alkoxylates prepared in this manner can be stored separately under an inert gas atmosphere. They are preferably used in the process according to the invention, in particular when the materials that are being used are sensitive to hydrolysis under alkaline conditions or the amount of low molecular weight starter in the preparation of long-chained polyols is not sufficient to ensure adequate mixing of the reaction mixture at the start of the reaction. Furthermore, some low molecular weight starters tend to form sparingly soluble alkali or alkaline earth metal salts; the prior conversion of the starter into a polymeric alkoxylate by the above-described process is likewise recommended in such cases. The amount of polymeric alkoxylate used in the process according to the invention is conventionally such that it corresponds to an alkali or alkaline earth metal hydroxide concentration, based on the amount of end product according to the invention that is to be prepared, of from 0.004 to 0.5 weight %, preferably from 0.01 to 0.1 weight %, and more preferably from 0.025 to 0.07 weight %. Of course, the polymeric alkoxylates can also be used in the form of mixtures.

Suitable alkylene oxides include, for example, ethylene oxide, propylene oxide, 1,2-butylene oxide or 2,3-butylene oxide, and styrene oxide. Propylene oxide and ethylene oxide are preferably used. As already mentioned, the amount of ethylene oxide should be at least 10 weight %, preferably at least 20 weight %, more preferably at least 30 weight % and most preferably more than 50 weight %, based on the total amount of alkylene oxides metered in. If the polymeric alkoxylates mentioned in the preceding paragraph are used as catalysts, or the above-mentioned pre-prepared alkylene oxide addition products are used as components in the starter mixture, the amounts of ethylene oxide used in their preparation are included in the calculation of the total ethylene oxide content. The ethylene oxide can be added in admixture with the other alkylene oxides or blockwise as starting, middle or end block. Products having ethylene oxide blocks are characterized, for example, by increased concentrations of primary end groups, which impart to the systems the necessary isocyanate reactivity for molded foam applications.

The crude alkaline polyols produced by the process herein generally have OH numbers of from 20 to 1000 mg KOH/g, and preferably OH numbers of from 28 to 700 mg KOH/g.

Working up of the crude alkaline polyols is then carried out by the addition of sulfuric acid in such a manner that, of from 66 mol % to 100 mol %, preferably from 75 mol % to 90 mol %, of the acid used, only the first dissociation stage is effective for neutralization of the amount of catalyst contained in the crude polymer. This can be achieved, for example, by using at least 50% more acid than would be necessary to neutralize the basic catalyst. The neutralization can be carried out at room temperature. If hydrolysis-sensitive functional groups such as, for example, ester groups are present, the neutralization can also be carried out at a markedly lower temperature such as, for example, at room temperature.

The actual neutralization can be preceded by a separate hydrolysis step, but this is not essential to the process according to the invention. The amount of water in such a hydrolysis step is up to 15 weight %, based on the amount of alkaline alkylene oxide addition product. The improvement in product quality achieved by the process according to the invention is particularly effective when the actual neutralization is preceded by a hydrolysis step, because the products so obtained otherwise have a stronger tendency to cloudiness.

The polyols obtainable by the process according to the invention preferably have base contents of less than 100 ppm, particularly preferably less than 50 ppm, and can be used as starting components for the production of compact or foamed polyurethane materials and also of polyurethane elastomers. These polyurethane materials and elastomers comprise the reaction product of a suitable polyisocyanate component with the polyols prepared herein. The polyurethane materials and elastomers can also comprise isocyanurate, allophanate and/or biuret structural units. It is also possible to prepare so-called isocyanate prepolymers, in the preparation of which a molar ratio of isocyanate groups to hydroxy groups of greater than 1 is used so that the product contains free isocyanate functionalities. These free isocyanate functionalities are not reacted until the preparation of the actual end product (i.e. a polyurethane) in one or more steps.

For the preparation of these materials (i.e. polyurethanes), the polyols according to the invention are, optionally, mixed with additional isocyanate-reactive components, and reacted with one or more organic polyisocyanates, optionally in the presence of one or more blowing agents, as well as one or more catalysts, and optionally, in the presence of other additives such as, for example, cell stabilizers.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples for the Preparation of the Polyols According to the Invention

Raw Materials Used:
The following raw materials were used in the working examples.
Soybean Oil:
Soybean oil (refined, i.e. which has had the lecithin removed, has been neutralized, bleached and steam stripped), obtained from Sigma-Aldrich Chemie GmbH, Munich.

Preparation of Polymeric Alkoxylate 1

1278.5 g of trimethylolpropane and 21.7 g of a 45 wt. % solution of KOH in water were introduced into a 10-liter laboratory autoclave under a nitrogen atmosphere. The autoclave was closed, the stirrer speed was set at 450 rpm, and the mixture was heated to 107° C. The pressure was lowered to 100 mbar and 653.4 g of propylene oxide were metered into the autoclave over a period of 3 hours. After a post-reaction time of 30 minutes at 107° C., the mixture was heated thoroughly for 30 minutes in vacuo. After cooling to room temperature, 45.1 g of a 45 wt. % solution of KOH in water were added under a nitrogen atmosphere. The mixture was heated to 107° C. and the water was removed in vacuo until a pressure of 10 mbar was reached. Then 4063.6 g of propylene oxide were metered in at 107° C. over a period of 8.5 hours and, after a post-reaction time of 120 minutes, the mixture was heated thoroughly for 30 minutes in vacuo. After cooling to room temperature, 539.4 g of a 45 wt. % solution of KOH in water were added under a nitrogen atmosphere. The mixture was heated to 107° C. and the water was removed in vacuo until a pressure of 10 mbar was reached. The alkali number of polymeric alkoxylate 1 is 44.1 mg KOH/g and its OH number is 260 mg KOH/g. The alkoxylate content is 17%.

Preparation of Polymeric Alkoxylate 2

3677.2 g of glycerol and 18.65 g of a 45 wt. % solution of KOH in water were introduced into a 10-liter laboratory autoclave under a nitrogen atmosphere. The autoclave was closed, the stirrer speed was set at 450 rpm, and the mixture was heated to 110° C. The pressure was lowered to 100 mbar and 2313.7 g of propylene oxide were metered into the autoclave over a period of 4.6 hours. After a post-reaction time of 180 minutes at 110° C., the pressure was slowly lowered to 100 mbar again, and finally the mixture was freed of water in vacuo until a pressure of less than 10 mbar was reached at a temperature of 110° C. The alkali number of polymeric alkoxylate 2 is 1.4 mg KOH/g and its OH number is 1121 mg KOH/g. The alkoxylate content is 0.125%.
Irganox® 1076:
Octadecyl 3-(3,5-di-tert-butyl-4-hydroxyphenyl)propionate Example 1

27.6 g of polymeric alkoxylate 1 and 1213.0 g of trimethylolpropane were introduced into a 10-liter laboratory autoclave under a nitrogen atmosphere. The autoclave was closed and a nitrogen pressure of 1.5 bar was applied. The mixture was heated to 150° C. with stirring (450 rpm), and 4646.9 g of ethylene oxide were metered into the autoclave over a period of 13.2 hours, likewise at a stirrer speed of 450 rpm. During the metering time, an interim reactor pressure of 4 bar was reached, the mixture was then allowed to react to completion for 25 minutes, the pressure was lowered to 2.55 bar by letting off the nitrogen, and the metered ethylene oxide addition was resumed. The metered ethylene oxide addition was followed by a post-reaction time of 45 minutes. After a heating time of 30 minutes in vacuo and cooling to room temperature, 2 portions (Examples 1A and 1B) were removed from the mixture for neutralisation tests. The catalyst concentration, calculated on KOH, was 207 ppm.

Example 1A (Comparison)

75 g of distilled water, 1.4571 g of 11.83% sulfuric acid and 1.038 g of Irganox® 1076 were added at 80° C. to 936 g of the product of Example 1, and stirring was carried out for one hour at 80° C. The product was then dewatered for one hour at 18 mbar (water-jet vacuum) and then for 3 hours at 110° C. and 1 mbar. The product then exhibited slight cloudiness.

Example 1B 156 g of distilled water, 5.076 g of 11.83% sulfuric acid and 2.155 g of Irganox® 1076 were added at 80° C. to 1952.5 g of the product of Example 1, and stirring was carried out for one hour at 80° C. The product was then dewatered for one hour at 18 mbar (water-jet vacuum) and then for 3 hours at 110° C. and 1 mbar. A clear product was obtained.

Example 2

5.49 g of polymeric alkoxylate 1 and 243.7 g of trimethylolpropane were introduced into a 2-liter laboratory autoclave under a nitrogen atmosphere. The autoclave was closed and its contents were heated to 150° C. with stirring (700 rpm). 956.9 g of ethylene oxide were metered into the autoclave over a period of 6 hours, likewise at a stirrer speed of 700 rpm. Towards the end of the ethylene oxide addition phase, a reactor pressure of 1.9 bar was reached. The metered ethylene oxide addition was followed by a 20-minute post-reaction time. After a heating phase of 30 minutes in vacuo, two portions (Examples 2A and 2B) were removed from the mixture for neutralisation tests. The catalyst concentration, calculated on KOH, was 200 ppm.

Example 2A 56 g of distilled water, 1.4150 g of 11.85% sulfuric acid and 0.622 g of Irganox® 1076 were added at 80° C. to 562.5 g of the product of Example 2, and stirring was carried out for one hour at 80° C. The product was then dewatered for one hour at 18 mbar (water-jet vacuum) and then for 3 hours at 110° C. and 1 mbar. A clear product was obtained.

Example 2B (Comparison)

56 g of distilled water and 5.9675 g of 3.293% phosphoric acid were added at 80° C. to 556.5 g of the product of Example 2, and the mixture was stirred for ½ hour at 80° C. After addition of 0.622 g of Irganox® 1076, the product was dewatered for one hour at 18 mbar (water-jet vacuum) and then for 3 hours at 110° C. and 1 mbar. A cloudy product was obtained.

Example 3

586.8 g of trimethylolpropane and 0.638 g of a 45 wt. % solution of KOH in water were introduced into a 2-liter laboratory autoclave under a nitrogen atmosphere. The autoclave was closed and its contents were heated to 150° C. with stirring (700 rpm). 595.5 g of ethylene oxide were metered into the autoclave over a period of 3.7 hours, likewise at a stirrer speed of 700 rpm. The metering was started at a pressure of 1.5 bar; towards the end of the ethylene oxide addition phase, a reactor pressure of 3.0 bar was reached. The metered ethylene oxide addition was followed by a post-reaction time of 30 minutes. After a heating phase of 30 minutes in vacuo, the mixture was cooled to 80° C. with stirring. The catalyst concentration (KOH) was 238 ppm. 113 ml of distilled water and 3.586 g of 11.845% sulfuric acid were added and the mixture was stirred for ½ hour at 80° C. 0.905 g of Irganox® 1076 were then added, and the mixture was then dewatered for one hour at 18 mbar (water-jet vacuum) and then for 3 hours at 110° C. and 1 mbar. A clear product was obtained.

Example 4

2627.4 g of trimethylolpropane and 2.695 g of a 44.8 wt. % solution of KOH in water were introduced into a 10-liter laboratory autoclave under a nitrogen atmosphere. The autoclave was closed and its contents were heated to 150° C. with stirring (450 rpm). 3372.6 g of propylene oxide were metered into the autoclave over a period of 5.03 hours, likewise at a stirrer speed of 450 rpm. The metered propylene oxide addition was started at a pressure of 1.1 bar; a pressure of 4.95 bar was reached during the metering phase. The metered propylene oxide addition was followed by a post-reaction time of 5 hours. The mixture was heated thoroughly for 30 minutes in vacuo and, after cooling to room temperature, was divided into three portions (Examples 4A, 4B and 4C). The catalyst concentration (KOH) was 200 ppm.

Example 4A (Comparison)

208 g of distilled water and 4.652 g of 11.85% sulfuric acid were added at 80° C. to 2081.4 g of the product of Example 4, and stirring was carried out for 0.5 hour at 80° C. After addition of 1.789 g of Irganox® 1076, the product was dewatered for 3 hours at 110° C. and 1 mbar. A cloudy product was obtained.

Example 4B (Comparison)

214 g of distilled water and 5.619 g of 11.85% sulfuric acid were added at 80° C. to 2146.9 g of the product of Example 4, and stirring was carried out for 0.5 hour at 80° C. After addition of 1.832 g of Irganox® 1076, the product was dewatered for 3 hours at 110° C. and 1 mbar. A cloudy product was obtained.

Example 4C (Comparison)

175 g of distilled water and 5.205 g of 11.85% sulfuric acid were added at 80° C. to 1753.3 g of the product of Example 4, and stirring was carried out for one hour at 80° C. After addition of 1.516 g of Irganox® 1076, the product was dewatered for 3 hours at 110° C. and 1 mbar. A slightly cloudy product was obtained.

Example 5

68.3 g of polymeric alkoxylate 1 and 1202.1 µg of trimethylolpropane were introduced into a 10-liter laboratory autoclave under a nitrogen atmosphere. The autoclave was closed and a nitrogen pressure of 1.5 bar was applied. The mixture was heated to 150° C. with stirring (450 rpm), and 4730.1 g of ethylene oxide were metered into the autoclave over a period of 13.45 hours, likewise at a stirrer speed of 450 rpm. During the metering time, an interim reactor pressure of 4 bar was reached, the mixture was then allowed to react to completion for 25 minutes, the pressure was lowered to 2.55 bar by letting off the nitrogen, and the metered ethylene oxide addition was resumed. The metered ethylene oxide addition was followed by a post-reaction time of 33 minutes. Finally, the product was heated thoroughly over a period of 30 minutes in vacuo and then cooled to room temperature. The catalyst concentration, calculated on KOH, was 500 ppm. 196 g of distilled water and 14.589 g of 11.85% sulfuric acid were added at 80° C. to 1956 g of the product, and stirring was carried out for 0.5 hour at 80° C. After addition of 2.170 g of Irganox® 1076, the product was dewatered for 3 hours at 110° C. and 1 mbar. A clear product was obtained.

Example 6

27.2 g of polymeric alkoxylate 1 and 1212.5 g of trimethylolpropane were introduced into a 10-liter laboratory autoclave under a nitrogen atmosphere. The autoclave was closed and a nitrogen pressure of 1.9 bar was applied. The mixture was heated to 150° C. with stirring (450 rpm), and 4761.1 g of ethylene oxide were metered into the autoclave over a period of 7.7 hours, likewise at a stirrer speed of 450 rpm. During the metering time, an interim reactor pressure of 4.9 bar was reached, the mixture was then allowed to react to completion for 53 minutes, the pressure was lowered to 2.5 bar by letting off the nitrogen, and the metered addition of ethylene oxide was resumed. The metered addition of ethylene oxide was followed by a post-reaction time of 1.6 hours. After a heating time of 30 minutes in vacuo and cooling to room temperature, 3 portions (Examples 6A, 6B and 6C) were removed from the mixture for neutralization tests. The catalyst concentration, calculated on KOH, was 200 ppm.

Example 6A (Comparison)

2.243 g of 11.98% sulfuric acid were added at 80° C. to 1467.8 g of the product of Example 6, and stirring was carried out for ½ hour at 80° C. After addition of 1.579 g of Irganox® 1076, the product was dewatered for one hour at 18 mbar (water-jet vacuum) and then for 3 hours at 110° C. and 1 mbar. A clear product was obtained.

Example 6B 4.593 g of 11.98% sulfuric acid were added at 80° C. to 1661 g of the product of Example 6, and stirring was carried out for ½ hour at 80° C. After addition of 1.832 g of Irganox® 1076, the product was dewatered for one hour at 18 mbar (water-jet vacuum) and then for 3 hours at 110° C. and 1 mbar. A clear product was obtained.

Example 6C 4.258 g of 11.98% sulfuric acid were added at 80° C. to 1459.1 g of the product of Example 6, and stirring was carried out for ½ hour at 80° C. After addition of 1.620 g of Irganox® 1076, the product was dewatered for one hour at 18 mbar (water-jet vacuum) and then for 3 hours at 110° C. and 1 mbar. A clear product was obtained.

Example 7

13.56 g of polymeric alkoxylate 1 and 1215.2 g of trimethylolpropane were introduced into a 10-liter laboratory autoclave under a nitrogen atmosphere. The autoclave was closed and a nitrogen pressure of 1.9 bar was applied. The mixture was heated to 150° C. with stirring (450 rpm), and 4771.5 g of ethylene oxide were metered into the autoclave over a period of 10.8 hours, likewise at a stirrer speed of 450 rpm. During the metering time, the metering was interrupted three times, the mixture was allowed to react to completion, the pressure was lowered to 2.5 bar by letting off the nitrogen, and then the metered addition of ethylene oxide was resumed. The metered addition of ethylene oxide was followed by a post-reaction time of one hour. After a heating time of 30 minutes in vacuo and cooling to room temperature, 3 portions (Examples 7A, 7B and 7C) were removed from the mixture for neutralization tests. The catalyst concentration, calculated on KOH, was 100 ppm.

Example 7A 3.690 g of 11.89% sulfuric acid were added at 80° C. to 2783 g of the product of Example 7, and stirring was carried out for ½ hour at 80° C. After addition of 1.401 g of Irganox® 1076, the product was dewatered for one hour at 18 mbar (water-jet vacuum) and then for 3 hours at 110° C. and 1 mbar. A clear product was obtained.

Example 7B (Comparison)

0.762 g of 11.89% sulfuric acid was added at 80° C. to 1015.7 g of the product of Example 7, and stirring was carried out for one hour at 80° C. After addition of 0.515 g of Irganox® 1076, the product was dewatered for one hour at 18 mbar (water-jet vacuum) and then for 3 hours at 110° C. and 1 mbar. A clear product was obtained.

Example 7C (Comparison)

0.202 g of 85% phosphoric acid was added at 80° C. to 987.1 g of the product of Example 7, and stirring was carried out for one hour at 80° C. After addition of 0.495 g of Irganox® 1076, the product was dewatered for one hour at 18 mbar (water-jet vacuum) and then for 3 hours at 110° C. and 1 mbar. A slightly cloudy product was obtained.

Example 8

688.83 g of sorbitol and 2.185 g of a 44.82 wt. % solution of KOH in water were introduced into a 10-liter laboratory autoclave under a nitrogen atmosphere. The autoclave was closed and its contents were stripped at 110° C., in vacuo, with 100 ml of nitrogen per minute over a period of 3 hours and at a stirrer speed of 450 rpm. 3296.0 g of soybean oil were added at approximately 110° C., under a nitrogen atmosphere, and the mixture was heated to 130° C. with stirring (450 rpm). The pressure was adjusted to 2.5 bar with nitrogen. At 130° C., 2021.5 g of ethylene oxide were metered into the autoclave over a period of 6.09 hours in such a manner that a total pressure of 5 bar was not exceeded. The metered ethylene oxide addition was followed by a post-reaction time of 5.82 hours. The catalyst concentration (KOH) was 163 ppm. After a heating phase of 30 minutes in vacuo and cooling to 40° C., 12.95 g of 11.89% sulfuric acid were added, and stirring was carried out for one hour at 40° C. After addition of 2.904 g of Irganox® 1076, the product was dewatered for one hour at 40° C. and 18 mbar (water-jet vacuum) and then for 3 hours at 110° C. and 1 mbar. A clear product was obtained.

Example 9

1200 g of polymeric alkoxylate 2 and 79.8 g of glycerol were introduced into a 10-liter laboratory autoclave under a nitrogen atmosphere. The autoclave was closed, heated to 150° C. with stirring (450 rpm), and a nitrogen pressure of 2.7 bar was applied. At 150° C., 4721.6 g of ethylene oxide were metered into the autoclave over a period of 8.1 hours, likewise at a stirrer speed of 450 rpm. During the metering time, the metering was interrupted once, the mixture was allowed to react to completion, the pressure was lowered to 2.5 bar by letting off the nitrogen, and then the metered ethylene oxide addition was resumed. The metered ethylene oxide addition was followed by a post-reaction time of one hour. After a heating time of 30 minutes in vacuo and cooling to room temperature, 2 portions (Examples 9A and 9B) were removed from the mixture for neutralization tests. The catalyst concentration, calculated on KOH, was 280 ppm.

Example 9A 5.524 g of 11.89% sulfuric acid were added at 80° C. to 1488.9 g of the product of Example 9, and stirring was carried out for one hour at 80° C. After addition of 0.748 g of Irganox® 1076, the product was dewatered for one hour at 18 mbar (water-jet vacuum) and then for 3 hours at 110° C. and 1 mbar. A clear product was obtained.

Example 9B (Comparison)

3.169 g of 11.89% sulfuric acid were added at 80° C. to 1523.2 g of the product of Example 9, and stirring was carried out for one hour at 80° C. After addition of 0.750 g of Irganox® 1076, the product was dewatered for one hour at 18 mbar (water-jet vacuum) and then for 3 hours at 110° C. and 1 mbar. A slightly cloudy product was obtained.

Example 10

642.3 g of diethylene glycol and 2.727 g of a 44.82 wt. % solution of KOH in water were introduced into a 10-liter laboratory autoclave under a nitrogen atmosphere. The autoclave was closed and its contents were stripped at 110° C., in vacuo, with 50 ml of nitrogen per minute over a period of 3 hours and at a stirrer speed of 450 rpm. The mixture was heated to 150° C. with stirring (450 rpm), and a nitrogen pressure of 2.5 bar was applied. At 150° C., a mixture of 4068.6 g of ethylene oxide and 1056.2 g of propylene oxide was metered into the autoclave over a period of 6.9 hours, likewise at a stirrer speed of 450 rpm. During the metering time, the metering was interrupted twice when a reactor pressure of 5 bar was reached, the mixture was allowed to react to completion each time, the pressure was lowered to 2.5 bar by letting off the nitrogen, and then the metered alkylene oxide addition was resumed. The alkylene oxide addition phase was followed by a post-reaction time of 2 hours. After a heating time of 30 minutes in vacuo and cooling to room temperature, 2 portions (Examples 10A and 10B) were removed from the mixture for neutralization tests. The catalyst concentration, calculated on KOH, was 201 ppm.

Example 10A 3.142 g of 11.82% sulfuric acid were added at 80° C. to 1240 g of the product of Example 10, and stirring was carried out for one hour at 80° C. After addition of 0.629 g of Irganox® 1076, the product was dewatered for one hour at 18 mbar (water-jet vacuum) and then for 3 hours at 110° C. and 1 mbar. A clear product was obtained.

Example 10B (Comparison)

1.928 g of 11.82% sulfuric acid were added at 80° C. to 1297.6 g of the product of Example 10, and stirring was carried out for one hour at 80° C. After addition of 0.655 g of Irganox® 1076, the product was dewatered for one hour at 18 mbar (water-jet vacuum) and then for 3 hours at 110° C. and 1 mbar. A clear product was obtained.

Example 11

325.5 g of sorbitol and 3.075 g of a 44.82 wt. % solution of KOH in water were introduced into a 10-liter laboratory autoclave under a nitrogen atmosphere. The autoclave was closed and its contents were stripped at 110° C., in vacuo, with 50 ml of nitrogen per minute over a period of 3 hours and at a stirrer speed of 450 rpm. The mixture was heated to 150° C. with stirring (450 rpm), and 1135.1 g of propylene oxide were metered into the autoclave over a period of 3.22 hours in such a manner that a constant pressure of 5 bar was reached. After a post-reaction time of 2.45 hours, the reactor pressure was adjusted to 2.7 bar with nitrogen, and 4540.2 g of ethylene oxide were metered in over a period of 9.07 hours. During the metering time, the metering was interrupted twice when a reactor pressure of 5 bar was reached, the mixture was allowed to react to completion each time, the pressure was lowered to 2.5 bar by letting off the nitrogen, and then the metered alkylene oxide addition was resumed. The metered ethylene oxide addition was followed by a post-reaction time of 1.5 hours. After a heating time of 30 minutes in vacuo, the mixture was cooled to room temperature. The catalyst concentration, calculated on KOH, was 230 ppm. 6.475 g of 11.82% sulfuric acid were added at 80° C. to 2006.2 g of the product, and stirring was carried our for 0.5 hour at 80° C. After addition of 1.028 g of Irganox® 1076, the product was dewatered for 3 hours at 110° C. and 1 mbar. A clear product was obtained.

The ratios of the dissociation stages achieved during the neutralization are given in the following table as salt contents; the indication x mol % $K_2SO_4$ indicates, for example, that, of x mol % of the sulfuric acid used, both protons were effective in the neutralization process.

Example 12

821.9 g of glycerol and 1.609 g of a 44.82 wt. % solution of KOH in water were introduced into a 10-liter laboratory autoclave under a nitrogen atmosphere. The autoclave was closed and its contents were stripped at 110° C., in vacuo, with 50 ml of nitrogen per minute over a period of 3 hours and at a stirrer speed of 450 rpm. The mixture was heated to 150° C. with stirring (450 rpm), and 4150.1 g of propylene oxide were metered into the autoclave over a period of 11.67 hours in such a manner that a constant pressure of 5 bar was reached. After a post-reaction time of 9.3 hours, the reactor pressure was adjusted to 2.6 bar with nitrogen, and 1037.5 g of ethylene oxide were metered in over a period of 4.25 hours, likewise in such a manner that a total pressure of 5 bar was not exceeded. The metered ethylene oxide addition was followed by a post-reaction time of 3.18 hours. After a heating time of 30 minutes in vacuo, the mixture was cooled to room temperature. The catalyst concentration, calculated on KOH, was 120 ppm. 2 portions (Examples 12A and 12B) were removed from the mixture for neutralization tests.

Example 12A 1.918 g of 11.82% sulfuric acid were added at 80° C., under a nitrogen atmosphere, to 1080.6 g of the product of Example 12, and stirring was carried out for one hour at 80° C. After addition of 0.543 g of Irganox® 1076, the product was dewatered for one hour at 18 mbar (water-jet vacuum) and then for 3 hours at 110° C. and 1 mbar. A clear product was obtained.

Example 12B (Comparison)

1.002 g of 11.80% sulfuric acid were added at 80° C., under a nitrogen atmosphere, to 1129.3 g of the product of Example 12, and stirring was carried out for one hour at 80° C. After addition of 0.567 g of Irganox® 1076, the product was dewatered for one hour at 18 mbar (water-jet vacuum) and then for 3 hours at 110° C. and 1 mbar. A cloudy product was obtained.

Example 13

820.7 g of glycerol and 1.471 g of a 44.82% solution of KOH in water were introduced into a 10-liter laboratory autoclave under a nitrogen atmosphere. The autoclave was closed and its contents were stripped at 110° C., in vacuo, with 50 ml of nitrogen per minute over a period of 3 hours and at a stirrer speed of 450 rpm. The mixture was heated to 150° C. with stirring (450 rpm), and a nitrogen pressure of 2.5 bar was applied to the autoclave. A mixture of 1289.2 g of propylene oxide and 3884.5 g of ethylene oxide was then metered into the autoclave over a period of 10.53 hours in such a manner that a maximum pressure of 5 bar was reached. The metered alkylene oxide addition was followed by a post-reaction time of 3.25 hours. After a heating time of 30 minutes in vacuo, the mixture was cooled to room temperature. The catalyst concentration, calculated on KOH, was 110 ppm. 3.547 g of 11.80% sulfuric acid were added at 80° C., under a nitrogen atmosphere, to 2417.1 g of the reaction product, and stirring was carried out for one hour at 80° C. After addition of 1.210 g of Irganox® 1076, the product was dewatered for one hour at 18 mbar (water-jet vacuum) and then for 3 hours at 110° C. and 1 mbar. A clear product was obtained.

| Example | Molar ratio of the salts formed | Measured base content [ppm KOH] | Measured acid number [ppm KOH] | Measured OH number [mg KOH/g] | Appearance |
|---|---|---|---|---|---|
| 12A | 100 mol % $KHSO_4$ | <blank value | 19 | 248 | clear |
| 12B (comp.) | 100 mol % $K_2SO_4$ | 61 | 10 | 248 | cloudy |
| 13 | 11 mol % $K_2SO_4$; 89 mol % $KHSO_4$ | 7 | 9 | 249 | clear |
| 1A (comp.) | 96.3 mol % $K_2SO_4$; 3.7 mol % $KHSO_4$ | 98 | 14 | 256 | cloudy |
| 1B | 18 mol % $K_2SO_4$; 82 mol % $KHSO_4$ | 33 | 16 | 258 | clear |
| 2A | 18 mol % $K_2SO_4$; 82 mol % $KHSO_4$ | 46 | 64 | 260 | clear |
| 2B | 100 mol % $KH_2PO_4$ | 187 | 153 | 260 | cloudy |
| 3 | 18 mol % $K_2SO_4$; 82 mol % $KHSO_4$ | 31 | 68 | 625 | clear |
| 4A (comp.) | 33 mol % $K_2SO_4$; 67 mol % $KHSO_4$ | not determined | 51 | 548 | cloudy |
| 4B (comp.) | 13 mol % $K_2SO_4$; 87 mol % $KHSO_4$ | not determined | 37 | 548 | cloudy |
| 4C (comp.) | 100 mol % $KHSO_4$ | not determined | 42 | 549 | slightly cloudy |
| 5 | 100 mol % $KHSO_4$ | 0.2 | 71 | 249 | clear |
| 6A (comp.) | 91 mol % $K_2SO_4$; 9 mol % $KHSO_4$ | 108 | 11 | 253 | clear |
| 6B | 5 mol % $K_2SO_4$; 95 mol % $KHSO_4$ | 2 | 17 | 253 | clear |
| 6C | 100 mol % $KHSO_4$ | 8 | 16 | 253 | clear |
| 7A | 11 mol % $K_2SO_4$; 89 mol % $KHSO_4$ | 9 | 17 | 255 | clear |
| 7B (comp.) | 95 mol % $K_2SO_4$; 5 mol % $KHSO_4$ | 63 | 16 | 256 | clear |
| 7C (comp.) | 100 mol % $KH_2PO_4$ | 95 | 11 | 255 | slightly cloudy |
| 8 | 89 mol % $KHSO_4$; 11 mol % $K_2SO_4$ | n.d. | 170 | 211 | clear |
| 9A | 89 mol % $KHSO_4$; 11 mol % $K_2SO_4$ | 19 | 16 | 252 | clear |
| 9B (comp.) | 2 mol % $KHSO_4$; 98 mol % $K_2SO_4$ | 128.3 | 15.3 | 253 | slightly cloudy |
| 10A | 83 mol % $KHSO_4$; 17 mol % $K_2SO_4$ | 36 | 22 | 111.8 | clear |
| 10B (comp.) | 100 mol % $K_2SO_4$ | 108 | 10 | 112.1 | clear |
| 11 | 95 mol % $KHSO_4$; 5 mol % $K_2SO_4$ | 32 | 37 | 100.3 | clear |

What is claimed is:

1. A process for the preparation of polyols comprising
(1) base-catalysed addition of
   (a) one or more alkylene oxides, wherein the proportion of ethylene oxide in the alkylene oxides is at least 10 weight %, based on 100 weight % of the alkylene oxides,
   to
   (b) one or more polyfunctional starter compounds having Zerewitinoff-active hydrogen atoms,
   in the presence of
   (c) one or more catalysts selected from the group consisting of alkali metal hydroxides, alkali metal hydrides, alkaline earth metal hydrides, alkali metal carboxylates, alkaline earth metal carboxylates and alkaline earth hydroxides, in which the concentrations of said catalysts, based on the amount of end product, is from 0.004 to 0.5 weight %,
(2) neutralizing the alkaline polymerisation-active centers of the crude alkylene oxide addition product by adding sulfuric acid in such a manner that, of from 66 mol % to 100 mol % of the acid used, only the first dissociation stage of sulfuric acid is effective for neutralization of the amount of catalyst contained in the crude polymer,
wherein the resultant polyols are not filtered.

2. The process of claim 1, in which from 10 to 80 weight % of triglycerides, based on the amount of end product, are added before or during the addition of the alkylene oxides.

3. The process of claim 1, wherein the concentrations of said catalysts, based on the amount of end product is from 0.01 to 0.1 weight %.

4. The process of claim 1, wherein the proportion of ethylene oxide in the alkylene oxides is at least 20 weight %, based on 100 weight % of the alkylene oxides.

5. The process of claim 1, wherein the resultant polyol is clear and has a base content of less than 100 ppm.

6. The process of claim 5, wherein the base content is less than 50 ppm.

* * * * *